United States Patent Office 3,541,351
Patented Nov. 17, 1970

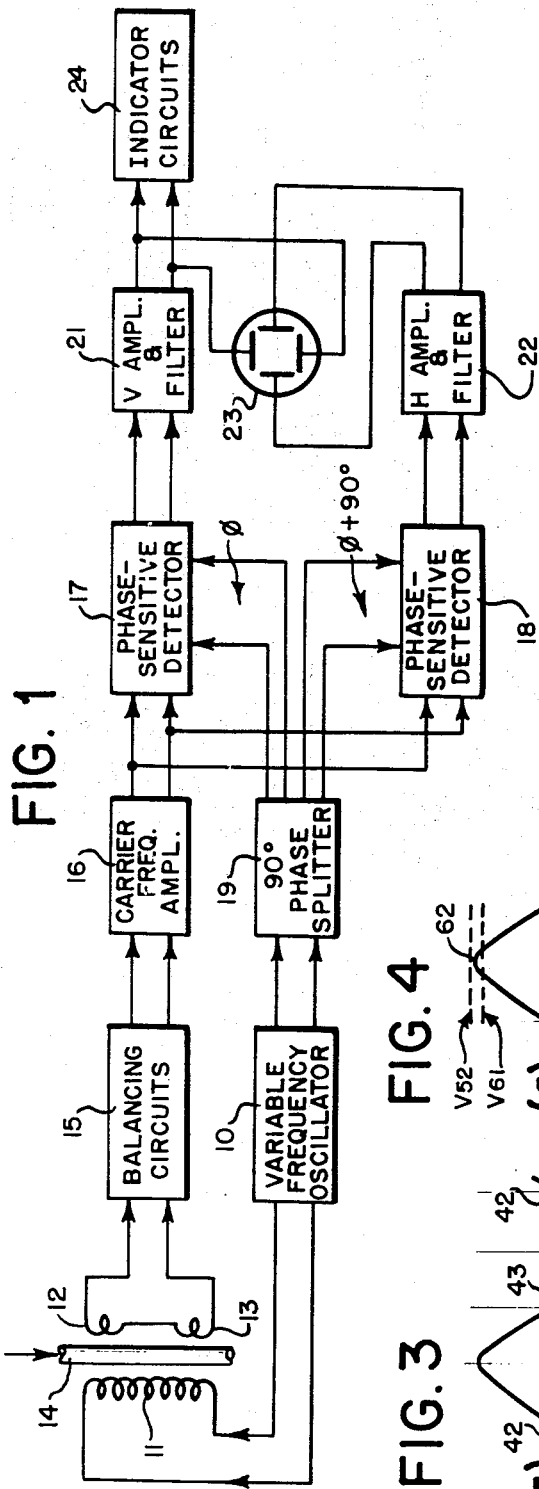
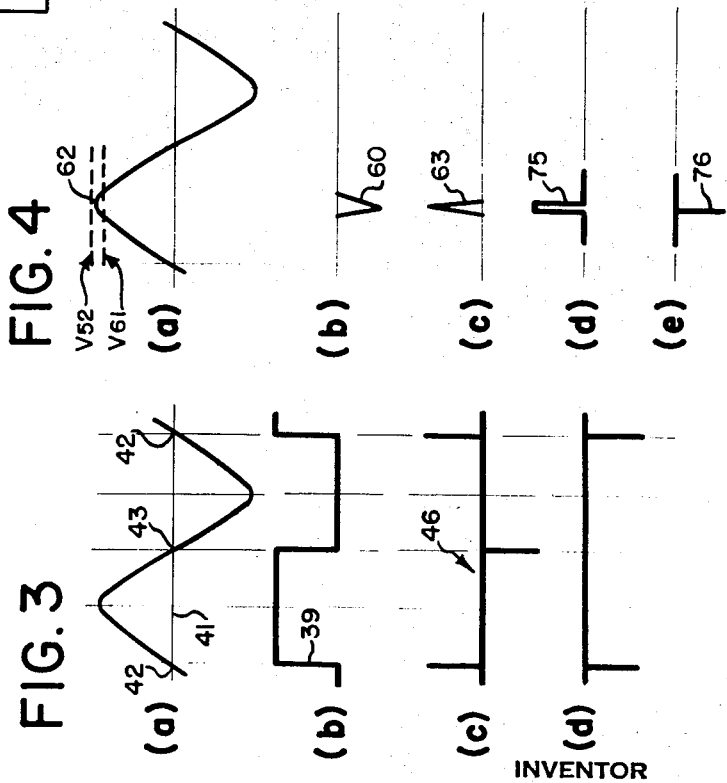
FIG. 1
FIG. 3
FIG. 4
INVENTOR
Sven E. Mansson
ATTORNEYS

3,541,351
QUADRATURE PULSE GENERATOR
Sven E. Mansson, Kings Point, N.Y., assignor to Magnetic Analysis Corporation, Mount Vernon, N.Y., a corporation of New York
Filed July 3, 1968, Ser. No. 742,326
Int. Cl. H03k 5/20
U.S. Cl. 307—232     8 Claims

ABSTRACT OF THE DISCLOSURE

Phase-quadrature related series of pulses are produced from the sine wave output of a variable frequency oscillator, one series corresponding to peaks and the other to cross-overs of the sine wave. To enable operation over a wide frequency range, with varying sine wave amplitudes, a series diode supplies peaks of the sine wave to a transistor amplifier, a diode clamping circuit clamps peaks at the input of the series diode to a clamping level, and a bias resistor in the transistor input circuit has a voltage divider thereacross which produces a clamping level predetermined to allow the series diode to conduct during the peaks above a corresponding clipping level. The output pulses are supplied to a second transistor amplifier whose bias is controlled to produce resultant pulses of stable amplitude. These resultant pulses, and the initial sine wave, may be applied to respective channels each containing a bistable multivibrator, a differentiator and a polarity selector to produce respective series of phase-quadrature related pulses.

BACKGROUND OF THE INVENTION

Phase-sensitive detectors for producing qaudrature signal outputs from an input signal are well-known. In general, an input signal and a reference voltage are applied to each detector, one or the other being phase-split into 90° components. For some applications it is necessary to operate over a considerable frequency range. In such cases it is commonly necessary to switch components in the phase-splitter in order to obtain satisfactory operation.

An example is in the field of eddy current testing wherein an alternating current is applied to the primary of a test coil arrangement to induce eddy currents to flow in the object under test, and a secondary coil or coils picks up an alternating signal which varies in amplitude or phase, or both, with defects or flaws in the object. Quadrature components of the test coil output signal are produced and supplied to horizontal and vertical deflection circuits of an oscilloscope to produce a polar coordinate display of the signal amplitude and phase. One or the other of the quadrature components may be applied to indicator apparatus such as a chart recorder or alarm, to indicate when the component exceeds a selected threshold value. In application Ser. No. 472,955, filed July 19, 1965 (now Pat. 3,405,354, dated Oct. 8, 1968), phase-range limiters are described which utilize the two quadrature components to confine the indications to a particular phase angle range. This assists in separating objectionable types of defects or flaws from unobjectionable types.

Frequently it is necessary in eddy current testing apparatus to provide several different oscillator frequencies in order to detect different types of defects. In one apparatus it was desired to provide frequencies ranging from a few kilohertz to several hundred kilohertz. With conventional phase-splitters, this would require a number of switchings of components to yield satisfactory operation.

The present invention provides a phase-splitter operable over a wide frequency range without switching of components, and yielding quadrature-related series of reference pulses which, when applied to gaiting-type phase-sensitive detectors, will yield satisfactory quadrature components of a signal applied thereto.

Although particularly designed for eddy current testing apparatus, the invention may be used in other applications where quadrature-related series of pulses varying in frequency over a wide range are required.

SUMMARY OF THE INVENTION

In accordance with the invention the sine-wave output of a variable frequency oscillator is supplied to two channels, in one of which pulses corresponding to the cross-overs in one direction of the sine wave are produced, and in the other of which pulses corresponding to the peak values in one direction are produced.

Inasmuch as the slope of a sine wave is greatest at the cross-overs thereof, that is, where the wave changes from positive to negative or vice versa with respect to its AC axis, pulses corresponding to the cross-overs can be generated which remain quite constant in phase, amplitude and duration even though the sine wave frequency is changed over a considerable range and the amplitude varies. In the specific embodiment described hereinafter, the sine wave is applied to a bi-stable multivibrator to produce a square wave, the square wave is differentiated to yield narrow pulses or spikes of opposite polarity at the leading and trailing edges thereof, and narrow pulses of one polarity are selected to produce an output series of pulses corresponding to the cross-overs in one direction of the initial sine wave.

Generating pulses accurately corresponding to the peaks of the sine wave is more difficult, particularly when the frequency is changed and the amplitude varies. At the precise peak the slope is zero, and the slope changes rather slowly on either side thereof. In order to obtain narrow pulses closely corresponding to the peak value, clipping just below the precise peak is required. Thus the difference between the clipping level and the precise peak must be maintained quite constant despite changes in amplitude and frequency.

The present invention provides a simple circuit for accomplishing this without requiring excessively close tolerances and expensive components. The sine wave is applied to a diode in series with the input circuit of a transistor amplifier and a diode clamping circuit clamps peaks of the sine wave to a clamping level at the input of the series diode. Bias current is supplied to the transistor input circuit through a bias resistor, and a voltage divider connected across the bias resistor has an intermediate point connected to the clamping circuit to produce the clamping level. Both the series and clamping diodes commonly have threshold voltages, or contact potentials, which must be exceeded before the diodes conuct substantial current in their forward directions. The voltage divider takes these threshold voltages into account to produce a clipping level just below the peaks of the sine wave, the series diode conducting above the clipping level. In this manner narrow pulses closely corresponding to the precise peak of the sine wave are supplied to the amplifier, and the circuit is self-adjusting for different amplitudes of the sine wave. Further, although the time duration of the narrow pulses may change with changes in frequency, the number of degrees of the sine wave included within a pulse is substantially independent of frequency so that the phase relationship between the pulses and the sine wave is substantially independent of frequency.

The amplified pulses are advantageously fed to a second transistor amplifier whose bias is controlled by rectified output pulses therefrom, so that resultant pulses of stable amplitude may be obtained. The resultant pulses are then fed to a bi-stable multivibrator, differentiator and polarity selector similar to those used in the first channel. By adjusting the triggering levels of the multivibrators in the two channels, the time occurrence of the output series of pulses from the two channels may be adjusted to yield a close phase-quadrature relationship which will be maintained satisfactorily over a wide frequency range and considerable amplitude range.

BRIEF DESCRIPTION OF THE DRAWINGS

FIG. 1 is a block diagram illustrating eddy current testing apparatus wherein the phase-splitter of the invention is useful;

FIGS. 3 and 4 show explanatory waveforms for FIG. 2.

DESCRIPTION OF THE SPECIFIC EMBODIMENT

Figure 2:
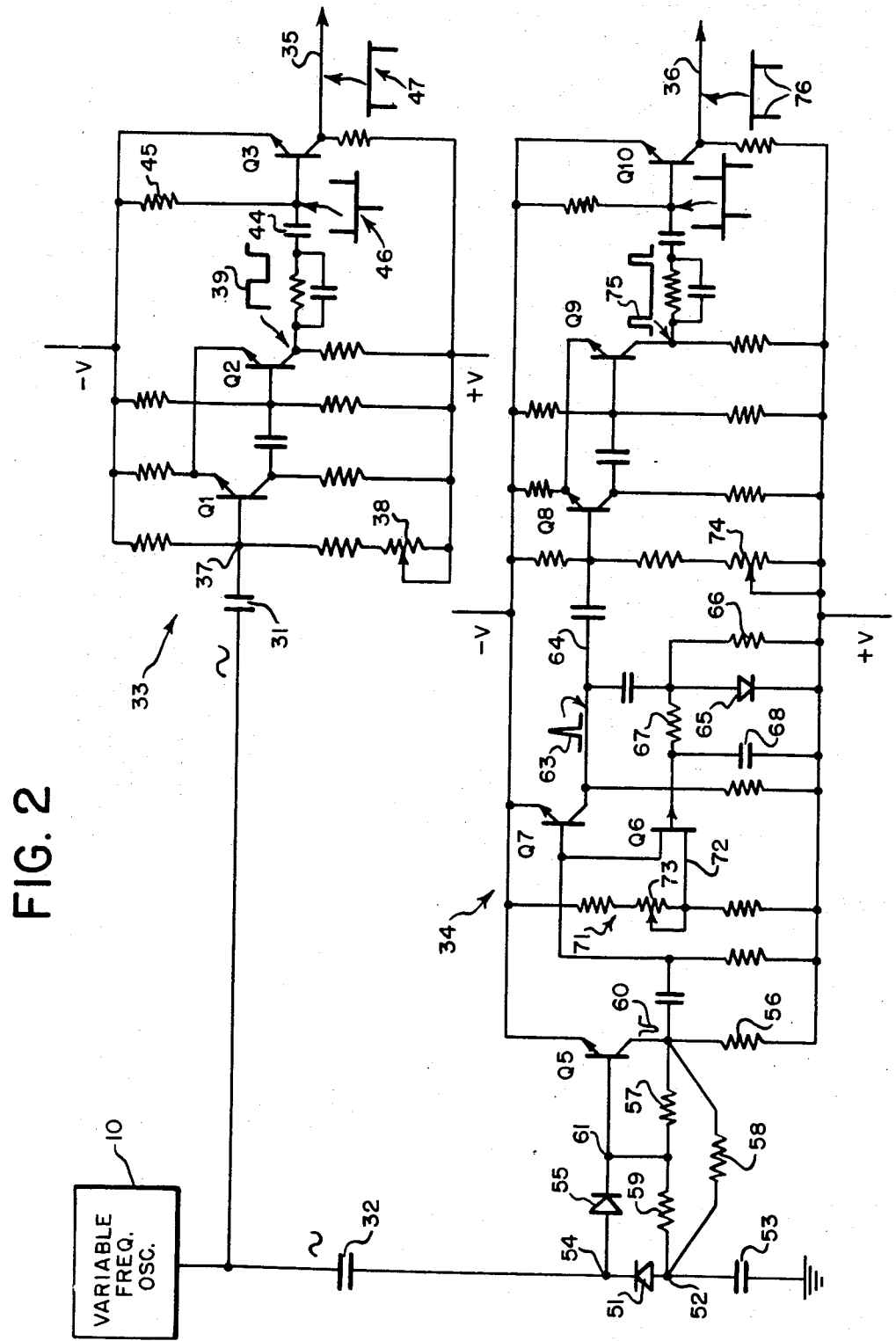
FIG. 2 is a circuit diagram of a specific embodiment of the phase-splitter of the invention.

Referring to FIG. 1, a variable frequency oscillator 10 energizes the primary winding 11 of a set of test coils having secondary windings 12, 13. This arrangement is designed for testing rods, tubes, etc., continuously moving through the test coils, as illustrated at 14. Secondary coils 12, 13 are connected in series and, through conventional balancing circuits 15, to a carrier frequency amplifier 16. Usually coils 12 and 13 will be similar and connected to yield a null output in the absence of defects. Then, in the presence of flaws or other defects, a signal output at carrier frequency will be obtained from amplifier 16. The signal output may change in amplitude or phase, or both, depending on the type of flaws or other differences in the objects.

In order to display both amplitude and phase changes, quadrature components of the signal are produced. To this end the output of amplifier 16 is supplied to two phase-sensitive detectors 17, 18. Quadrature-related reference signals denoted $\phi$ and $\phi+90°$ are derived from the oscillator output via phase-splitter 19 and supplied to the phase-sensitive detectors. Accordingly quadrature output signals, here termed V and H, are obtained and supplied through respective amplifiers and filters 21, 22 to oscilloscope 23 for display. One component, here V, may be supplied to indicator circuits 24. If desired, both H and V components may be applied to a phase-range limiter as mentioned above.

Provision may be made to vary the vector angle of H and V, as by phase-shifting the output of oscillator 10 as supplied to phase-splitter 19. Such provisions are omitted here for simplicity.

A phase-splitter 19 in accordance with the present invention is shown in FIG. 2, and illustrative waveforms in FIGS. 3 and 4. The sine wave output of oscillator 10 is shown in FIGS. 3(a) and 4(a). The frequency may be changed to suit test requirements. Commonly, the amplitude will also vary somewhat, particularly when the frequency is changed. The sine wave is AC coupled through capacitors 31, 32 to two channels generally designated 33 and 34, which yield respective series of pulses in output lines 35, 36 in phase-quadrature relationship.

The upper channel 33 includes transistors Q1 and Q2 interconnected to form a bistable multivibrator of the Schmitt type. The transistors here shown are of the NPN type. The circuit design follows conventional practice so that only the overall operation need be described.

The bias at point 37 may be set by adjusting potentiometer 38 connected to form a variable resistance. When the applied sine wave goes sufficiently above the bias level at point 37, Q1 conducts and Q2 becomes non-conducting. When the applied sine wave goes sufficiently below the bias level, Q1 becomes non-conducting and Q2 conducts. Thus the collector output of Q2 is a square wave as shown by waveform 39.

By properly adjusting the bias at point 37, the multivibrator may be triggered at the cross-over points of the sine wave, that is, the points on the sine wave where it changes from positive to negative, or vice versa, with respect to its AC axis. This is illustrated in FIG. 3(a) where line 41 is the AC axis and the cross-over points are 42 and 43. With NPN transistors, Q1 becomes conductive at or near point 42, and non-conductive at or near point 43. The exact points of triggering can be established by adjusting potentiometer 38. The resultant output of Q2 is square wave as shown in FIG. 3(b). This is supplied to a differentiating circuit including capacitor 44 and resistor 45 to produce sharp spikes 46 at leading and trailing edges thereof as shown in FIG. 3(c). These are applied to transistor Q3. Positive spikes cause the transistor to conduct but negative spikes leave Q3 non-conducting. Consequently, the output in line 35 consists of only negative pulses 47 corresponding to the positive-going edges of the square wave. This is illustrated in FIG. 3(d). As will be recognized, these pulses occur at substantially the crossovers in one direction of the applied sine wave.

The lower channel 34 includes circuits in accordance with the invention which produce pulses corresponding to the peaks of the sine wave substantially independent of amplitude and frequency over a considerable range. Input capacitor 32 and diode 51 form a clamping circuit which clamps the peaks of the sine wave at a clamping level corresponding to the voltage level at point 52. Capacitor 53 in series with the clamping diode provides a low impedance path for the sine wave input. When the sine wave is applied, capacitor 32 charges until the voltage at junction point 54 at the positive peaks of the sine wave is that of junction point 52 minus the contact potential or threshold voltage of diode 51. This is commonly of the order of 0.6 volt for a silicon diode. Diode 55 connects junction point 54 with the base of transistor Q5, here shown as of the NPN type. Q5 is connected as an amplifier with collector load resistor 56. Base-emitter bias current for Q5 is obtained by connecting resistor 57 between the collector and base. A voltage divider formed by resistors 58 and 59 is connected in shunt with resistor 57. These are conveniently of high resistance compared to 57. An intermediate point on the voltage divider is connected to the clamping circuit at 52.

The operation of this circuit will be described before proceeding further. Diode 55 will normally have a contact potential such that, with the polarity shown, the voltage at point 54 must exceed the voltage at point 61 by a small amount, say 0.6 volt for a silicon diode, before diode 55 will conduct. First consider that resistor 58 is removed. No current will then flow through resistor 59 and points 52 and 61 will be at the same potential. Since point 54 will be negative to point 52 at the peaks of the sine wave, diode 55 will be back-biased and will not conduct. With resistor 58 present, point 52 will be somewhat positive to point 61, thus making the voltage at point 54 at the peaks of the sine wave more positive. With proper selection of the values of resistors 58 and 59, diode 55 will conduct during the peaks of the sine wave about a clipping level corresponding to the clamping level at point 52, but differing therefrom by the threshold voltage of diode 51.

This operation is illustrated in FIG. 4. In FIG. 4(a), V52 represents the voltage at point 52, and the peak 62 of the sine wave is below V52 by an amount determined by the threshold voltage of diode 51. V61 represents the voltage level at point 61, which is below V52. Whenever the voltage at point 54 exceeds V61 by an amount greater than the threshold voltage of diode 55, current will flow through the diode to the base of Q5. Thus a clipping level is established and only the peaks of the sine wave pass to Q5. By changing resistor 58, the clipping level can be changed, and is ordinarily selected so that only a small portion of the peak is passed, thus yielding a narrow pulse 60 in the output circuit of Q5 as illustrated in FIG. 4(b).

It will be appreciated that the voltage at point 54 at the peaks of the applied sine wave will be substantially independent of amplitude and frequency over a considerable range. Also, the clipping level will be substantially independent of amplitude and frequency so that narrow output pulses from Q5 may be obtained regardless of changes in oscillator frequency.

For illustrative purposes, and not by way of limitation, in one embodiment of the invention which has been operated with success diodes 51, 55 were type 1N627 and transistor Q5 was type 2N697. Resistors 56, 57, 58 and 59 were 10K, 150K, 10M and 1M, respectively. Capacitors 32 and 53 were 0.1 mfd. Voltages +V and —V were +12 volts and —12 volts, respectively. The DC voltages were approximately —2.0 and —7.5 at the collector and base of Q5, with respect to ground. The voltages at points 52 and 54 were not measured, since the probe affected the operation. With an applied sine wave of about 3 volts peak-to-peak, 10 millivolt pulses were produced at point 61, and 2 volt pulses at the collector of Q5.

The output pulses at the collector are AC coupled to the base of transistor Q7, connected as an amplifier yielding resultant pulses 63 in output line 64. These pulses are also shown in FIG. 4(c). To take care of any residual variations in the pulse output of Q5, the resultant pulses 63 are supplied to a rectifier circuit including diode 65 and resistor 66. The rectified current is filtered by resistor 67 and capacitor 68 and supplied to the gate of an FET transistor Q6. The source-drain circuit of Q6 is included in the bias circuit for Q7. A voltage divider 71 is connected from —V to +V to provide a desired voltage at line 72, adjustable by potentiometer 73. The resistance of Q6 between line 72 and the base of Q7 controls the base-emitter bias of Q7.

The rectified voltage to the gate of Q6 controls the resistance thereof and consequently the bias of Q7. The bias control maintains the proper bias for different amplitude applied pulses to Q7 so that amplitude variations in pulses 63 are largely eliminated. Pulses 63 may also be somewhat narrower than pulses 60.

The resultant pulses 63 are applied to circuits similar to those already described for the upper channel 33. Q8 and Q9 form a bistable multivibrator wherein Q8 is triggered on at the leading edge of an applied pulse and triggered off at the trailing edge. The exact point of triggering is adjustable by potentiometer 74. This results in a rectangular wave 75 at the output of Q9. The leading and trailing edges are differentiated and applied to Q10 as in the upper channel, yielding resultant output pulses 76. These pulses will be substantially the same in amplitude, shape and duration as those in the output of the upper channel, displaced therefrom by 90° of the initial sine wave.

As will be understood, the output pulses in line 36 of the lower channel are derived from the leading edges of pulses which in turn were derived from the peaks of the applied sine wave. These pulses, although narrow, will have a finite width and their leading edges may not correspond exactly to the peak value of the sine wave. The bias in the upper channel, adjustable by 38, may be selected so that the multivibrator therein triggers at a point slightly different from the exact zero value of the sine wave, thereby yielding output pulses from the upper channel closely in phase quadrature with those of the lower channel.

The transistors here used are NPN silicon transistors. However, PNP types may be employed if desired, with appropriate changes in the polarity of diodes 51 and 55, etc., as will be understood by those skilled in the art.

The invention has been described in connection with a specific embodiment thereof. It will be understood that modifications may be made to suit the requirements of a particular application.

I claim:

1. Apparatus for generating phase quadrature related series of pulses which comprises
   (a) a variable frequency sine wave oscillator,
   (b) means for producing a first series of pulses corresponding substantially to the cross-overs in one direction of the sine wave from said oscillator,
   (c) and means for producing a second series of pulses corresponding substantially to the peaks in one direction of said sine wave,
   wherein the last-mentioned means comprises
   (d) a transistor amplifier having input and output circuits,
   (e) a series diode for supplying said peaks in one direction to the transistor amplifier input circuit,
   (f) a clamping circuit including a clamping diode for clamping said peaks at the input of said series diode to a clamping level,
   (g) means for supplying bias current through a bias resistor to said transistor amplifier input circuit,
   (h) and a voltage divider connected in shunt with said bias resistor,
   (i) an intermediate point of said voltage divider being connected to said clamping circuit to produce a clamping level predetermined to allow said series diode to conduct during said peaks in one direction above a corresponding clamping level,
   (j) whereby output pulses from said transistor amplifier corresponding to said peaks may be obtained.

2. Apparatus according to claim 1 including
   (a) a second transistor amplifier having an input circuit supplied with said output pulses and an output circuit yielding resultant pulses,
   (b) biasing means for biasing the input circuit of said second transistor amplifier,
   (c) rectifying means supplied with said resultant pulses for producing a bias control signal,
   (d) and means for utilizing said bias control signal to control said biasing means to reduce amplitude variations in said resultant pulses.

3. Apparatus according to claim 2 including
   (a) a pair of channels each including
      (1) a bistable multivibrator for producing a rectangular wave output,
      (2) a differentiator for differentiating said rectangular wave output to produce narrow pulses at edges thereof, and
      (3) means for selecting one polarity of said narrow pulses to produce an output series of pulses,
   (b) said means for producing a first series of pulses comprising one of said channels with said sine wave triggering the multivibrator therein to opposite states at cross-overs in opposite directions of the sine wave,
   (c) said resultant pulses being applied to the other of said channels to trigger the multivibrator therein to opposite states at leading and trailing edges of the resultant pulses,
   (d) whereby the output series of pulses of the pair of channels are phase-quadrature related.

4. Apparatus according to claim 1 in which
   (a) said clamping circuit includes
      (1) an input capacitor connected to said clamping diode at a first junction point to clamp said peaks thereat,
      (2) and a second capacitor connected in series with the clamping diode at a second junction point on the opposite side of the diode from the first junction point,
   (b) said series diode being connected to said first junction point, and
   (c) said intermediate point on the voltage divider being connected to said second junction point.

5. Apparatus according to claim 4 in which said clamping diode is poled from said second to said first junction points in the same direction as said series diode is poled from said first junction point to the transistor amplifier input circuit.

6. Apparatus according to claim 5 in which (a) said transistor amplifier has a base-emitter input circuit and a base-collector output circuit,
(b) said bias resistor being connected between the collector and base of the transistor to provide base-emitter bias current,
(c) said series diode being connected to the transistor base,
(d) and said voltage divider comprises a resistor connecting the transistor collector with said second junction point and a resistor connecting said second junction point with the transistor base.

7. Apparatus according to claim 6 including
(a) a second transistor amplifier having an input circuit supplied with said output pulses from the first-mentioned amplifier and an output circuit yielding resultant pulses,
(b) biasing means for biasing the input circuit of said second transistor amplifier,
(c) rectifying means supplied with said resultant pulses for producing a bias control signal,
(d) and means for utilizing said bias control signal to control said biasing means to reduce amplitude variations in said resultant pulses.

8. Apparatus according to claim 7 including
(a) a pair of channels each including
    (1) a bistable multivibrator for producing a rectangular wave output,
    (2) a differentiator for differentiating said rectangular wave output to produce narrow pulses at edges thereof, and
    (3) means for selecting one polarity of said narrow pulses to produce an output series of pulses,
(b) said means for producing a first series of pulses comprising one of said channels with said sine wave triggering the multivibrator therein to opposite states at cross-overs in opposite directions of the sine wave,
(c) said resultant pulses being applied to the other of said channels to trigger the multivibrator therein to opposite states at leading and trailing edges of the resultant pulses.
(d) whereby the output series of pulses of the pair of channels are phase-quadrature related.

References Cited
UNITED STATES PATENTS

| | | | |
|---|---|---|---|
| 3,002,152 | 9/1961 | Yeaton et al. | 328—62 |
| 3,017,521 | 1/1962 | Herstedt | 307—264 X |
| 3,159,793 | 12/1964 | Welsh | 307—261 X |
| 3,405,354 | 10/1968 | Callan et al. | 328—166 X |

JOHN S. HEYMAN, Primary Examiner

S. D. MILLER, Assistant Examiner

U.S. Cl. X.R.

307—234, 260, 261, 262; 328—29, 60, 62, 150, 166